(12) United States Patent  
Pomestchenko et al.

(10) Patent No.: US 11,591,467 B2  
(45) Date of Patent: Feb. 28, 2023

(54) THERMOPLASTIC POLYMER COMPOSITES AND METHODS FOR PREPARING, COLLECTING, AND TEMPERING 3D PRINTABLE MATERIALS AND ARTICLES FROM SAME

(71) Applicant: GRAPHENE 3D LAB INC., Calverton, NY (US)

(72) Inventors: Irina Pomestchenko, Mt. Sinai, NY (US); Daniel Stolyarov, Baiting Hollow, NY (US); Elena Polyakova, Baiting Hollow, NY (US); Ivan Stolyarov, Moscow (RU)

(73) Assignee: G6 MATERIALS CORP., Ronkonkoma, NY (US)

( * ) Notice: Subject to any disclaimer, the term of this patent is extended or adjusted under 35 U.S.C. 154(b) by 580 days.

(21) Appl. No.: 15/748,018

(22) PCT Filed: Jul. 22, 2016

(86) PCT No.: PCT/US2016/043575  
§ 371 (c)(1),  
(2) Date: Jan. 26, 2018

(87) PCT Pub. No.: WO2017/019511  
PCT Pub. Date: Feb. 2, 2017

(65) Prior Publication Data  
US 2018/0208762 A1 Jul. 26, 2018

Related U.S. Application Data

(60) Provisional application No. 62/198,631, filed on Jul. 29, 2015.

(51) Int. Cl.  
*B33Y 70/10* (2020.01)  
*C08L 67/04* (2006.01)  
(Continued)

(52) U.S. Cl.  
CPC .............. *C08L 67/04* (2013.01); *B29C 48/05* (2019.02); *B29C 70/882* (2013.01); *B29C 71/02* (2013.01);  
(Continued)

(58) Field of Classification Search  
CPC ................................ C08K 3/042; B33Y 70/00  
See application file for complete search history.

(56) References Cited

U.S. PATENT DOCUMENTS 2,702,250 A 2/1955 Miller  
3,558,411 A 1/1971 Beelien  
(Continued)

FOREIGN PATENT DOCUMENTS

WO WO 2013010211 1/2013  
WO WO2013010211 1/2013  
(Continued)

OTHER PUBLICATIONS

International Search Report (ISR) and Written Opinion of the International Search Authority (WOISA) (dated Nov. 29, 2016) for PCT/US16/043575, 15 pages.

(Continued)

*Primary Examiner* — Andrew D Graham  
(74) *Attorney, Agent, or Firm* — Mark Malek; Widerman Malek, PL (57) ABSTRACT

Electrically conductive thermoplastic polymer composites of particulate thermoplastic polyester polymers, electrically conductive components (carbon nanofibers, graphene nanoplatelets, and/or conductive metal nanoparticulates), processing aids such as plasticizers, thermal stabilizers, etc., as well as nanoscopic particulate fillers such as nanoscopic titanium dioxide, etc., the electrically conductive components being distributed substantially uniformly in the composite to form an electrically conductive network. Also, (Continued)

methods for preparing thermoplastic polymer composites, a system for collecting extruded filaments prepared from thermoplastic polymer composites as a coil of filament, as well as method for tempering articles formed from thermoplastic polymer composites to increase the degree of crystallinity of the thermoplastic polymers and thus their mechanical strength properties.

13 Claims, 2 Drawing Sheets

(51) Int. Cl.

| | | |
|---|---|---|
| C04B 24/26 | (2006.01) | |
| C04B 26/18 | (2006.01) | |
| C08K 5/00 | (2006.01) | |
| C08K 3/013 | (2018.01) | |
| B29C 70/88 | (2006.01) | |
| B29C 48/05 | (2019.01) | |
| C08K 3/04 | (2006.01) | |
| B29C 71/02 | (2006.01) | |
| C08J 3/215 | (2006.01) | |
| C08K 3/08 | (2006.01) | |
| C08K 3/22 | (2006.01) | |
| C08K 5/11 | (2006.01) | |
| C08K 5/50 | (2006.01) | |
| C08K 5/524 | (2006.01) | |
| C08K 7/06 | (2006.01) | |
| C09D 11/104 | (2014.01) | |
| C09D 11/322 | (2014.01) | |
| C09D 11/52 | (2014.01) | |
| C04B 111/00 | (2006.01) | |
| C04B 111/94 | (2006.01) | |
| B29B 9/06 | (2006.01) | |
| B29K 67/00 | (2006.01) | |
| B29K 105/00 | (2006.01) | |
| B29K 105/16 | (2006.01) | |
| B29K 509/02 | (2006.01) | |

(52) U.S. Cl.
CPC .............. *B33Y 70/10* (2020.01); *C04B 24/26* (2013.01); *C04B 26/18* (2013.01); *C08J 3/215* (2013.01); *C08K 3/013* (2018.01); *C08K 3/042* (2017.05); *C08K 3/046* (2017.05); *C08K 3/08* (2013.01); *C08K 3/22* (2013.01); *C08K 5/005* (2013.01); *C08K 5/0016* (2013.01); *C08K 5/11* (2013.01); *C08K 5/50* (2013.01); *C08K 5/524* (2013.01); *C08K 7/06* (2013.01); *C09D 11/104* (2013.01); *C09D 11/322* (2013.01); *C09D 11/52* (2013.01); *B29B 9/06* (2013.01); *B29C 2071/027* (2013.01); *B29K 2067/046* (2013.01); *B29K 2105/0038* (2013.01); *B29K 2105/162* (2013.01); *B29K 2509/02* (2013.01); *B29K 2995/0005* (2013.01); *C04B 2111/00181* (2013.01); *C04B 2111/94* (2013.01); *C08J 2367/04* (2013.01); *C08K 2003/085* (2013.01); *C08K 2003/0806* (2013.01); *C08K 2003/2241* (2013.01); *C08K 2201/001* (2013.01); *C08K 2201/011* (2013.01); *C08L 2201/08* (2013.01)

(56) References Cited

U.S. PATENT DOCUMENTS

| | | | |
|---|---|---|---|
| 5,098,771 A * | 3/1992 | Friend | B29C 67/246 |
| | | | 361/751 |
| 5,518,680 A | 5/1996 | Cima et al. | |
| 6,451,895 B1 | 9/2002 | Meyer | |
| 6,475,663 B1 | 11/2002 | Mohwald et al. | |
| 6,790,403 B1 | 9/2004 | Priedeman, Jr. et al. | |
| 7,285,506 B2 | 10/2007 | Mardilovich et al. | |
| 7,582,328 B2 | 9/2009 | Rupich et al. | |
| 8,114,375 B2 | 2/2012 | Jang et al. | |
| 8,168,964 B2 | 5/2012 | Hiura et al. | |
| 8,222,190 B2 | 7/2012 | Zharmu et al. | |
| 8,222,321 B2 | 7/2012 | Youm et al. | |
| 8,257,867 B2 | 9/2012 | Liu et al. | |
| 8,287,699 B2 | 10/2012 | Shamu et al. | |
| 8,367,035 B2 | 2/2013 | Rogers et al. | |
| 8,487,296 B2 | 7/2013 | Grebel et al. | |
| 8,551,806 B2 | 10/2013 | Rueckes et al. | |
| 8,557,442 B2 | 10/2013 | Liu et al. | |
| 8,563,169 B2 | 10/2013 | Liu et al. | |
| 8,563,348 B2 | 10/2013 | Harris et al. | |
| 8,587,093 B2 | 11/2013 | Mardilovich et al. | |
| 8,628,167 B2 | 1/2014 | Nomura et al. | |
| 8,665,479 B2 | 3/2014 | Tan et al. | |
| 8,680,192 B2 * | 3/2014 | Avakian | C08L 67/04 |
| | | | 524/413 |
| 8,696,938 B2 | 4/2014 | Zhamu et al. | |
| 8,697,485 B2 | 4/2014 | Crain et al. | |
| 8,708,685 B2 | 4/2014 | Hickerson et al. | |
| 8,722,430 B2 | 5/2014 | Odagawa et al. | |
| 8,747,097 B2 | 6/2014 | Pettis | |
| 2003/0236588 A1 | 12/2003 | Jang et al. | |
| 2006/0108567 A1 * | 5/2006 | Charati | C08K 5/0091 |
| | | | 252/500 |
| 2007/0191526 A1 | 8/2007 | Jordan et al. | |
| 2007/0290410 A1 * | 12/2007 | Koo | B29C 64/153 |
| | | | 264/497 |
| 2008/0315453 A1 * | 12/2008 | Molitor | B82Y 30/00 |
| | | | 264/209.1 |
| 2009/0104386 A1 | 4/2009 | Barrera et al. | |
| 2009/0286894 A1 | 11/2009 | Cooper-White | |
| 2010/0028559 A1 * | 2/2010 | Yan | H01F 1/0054 |
| | | | 427/558 |
| 2010/0170626 A1 | 7/2010 | Lochtman et al. | |
| 2010/0209381 A1 | 9/2010 | Jeschke et al. | |
| 2010/0219381 A1 * | 9/2010 | Jeschke | C08K 3/38 |
| | | | 252/511 |
| 2011/0037033 A1 | 2/2011 | Green | |
| 2011/0049437 A1 | 3/2011 | Crain et al. | |
| 2011/0171364 A1 * | 7/2011 | Xing | C09D 7/45 |
| 2011/0245378 A1 * | 10/2011 | Russ | C08K 3/042 |
| | | | 523/440 |
| 2011/0260116 A1 | 10/2011 | Plee et al. | |
| 2011/0272646 A1 * | 11/2011 | Meyer | C08K 5/526 |
| | | | 252/587 |
| 2012/0244333 A1 | 9/2012 | Aksay et al. | |
| 2013/0197122 A1 * | 8/2013 | Gauchet | C08K 3/041 |
| | | | 522/157 |
| 2013/0316072 A1 | 11/2013 | Scordilis-Kelley et al. | |
| 2013/0320467 A1 | 12/2013 | Buchanan et al. | |
| 2014/0034214 A1 | 2/2014 | Boyer et al. | |
| 2014/0072833 A1 | 3/2014 | Loganathan et al. | |
| 2014/0134335 A1 | 5/2014 | Pridoehl et al. | |
| 2014/0323647 A1 | 10/2014 | Voit et al. | |
| 2014/0323847 A1 | 10/2014 | McCool | |
| 2014/0357788 A1 * | 12/2014 | Shene | C08K 3/042 |
| | | | 524/599 |
| 2015/0361228 A1 * | 12/2015 | Soler | C08K 3/04 |
| | | | 524/612 |
| 2016/0115293 A1 * | 4/2016 | Aksay | C08K 3/04 |
| | | | 524/496 |
| 2016/0276056 A1 * | 9/2016 | Stolyarov | C08J 3/11 |
| 2018/0208762 A1 * | 7/2018 | Pomestchenko | B29C 70/882 |

FOREIGN PATENT DOCUMENTS

| | | | |
|---|---|---|---|
| WO | WO 2014015994 | 1/2014 | |
| WO | WO 2014041323 | 3/2014 | |
| WO | WO 2014/210584 | 12/2014 | |
| WO | WO-2014210584 A1 * | 12/2014 | .......... B29C 64/165 |
| WO | WO 2015/156877 | 11/2015 | |

(56) References Cited

FOREIGN PATENT DOCUMENTS

| WO | WO 2016/036607 | 3/2016 |
|----|----------------|--------|
| WO | WO 2016140906  | 9/2016 |
| WO | WO 2017/019511 | 2/2017 |

OTHER PUBLICATIONS

International Search Report and Written Opinion of the International Search Authority (dated Jan. 11, 2016) for PCT/US15/047516 12 pages.
International Search Report and Written Opinion of the International Search Authority (dated Nov. 30, 2015) for PCT/US15/011878, 10 pages.
International Search Report (ISR) and Written Opinion of the International Search Authority (WOISA) (dated Oct. 24, 2014) for PCT/US14/044768, 14 pages.
International Search Report (ISR) and Written Opinion of the International Search Authority (WOISA) (dated May 6, 2016) for PCT/US16/020031, 13 pages.
Roy-Mayhew, "Functionalized Graphene Sheets in Dye-Sensitized Solar Cell Counter Electrodes," ACS Applied Materials & Interfaces, May 1, 2012 (2013 Dissertation), pp. 1-151.
"Graphene," Wikipedia at: http://en.wikipedia.org/wiki/Graphene, last checked May 15, 2014 (37 pages).

* cited by examiner

THERMOPLASTIC POLYMER COMPOSITES AND METHODS FOR PREPARING, COLLECTING, AND TEMPERING 3D PRINTABLE MATERIALS AND ARTICLES FROM SAME

CROSS-REFERENCE TO RELATED APPLICATIONS

This application is a national stage application of PCT Application Serial Number PCT/US16/043575, filed Jul. 22, 2016, which makes reference to and claims the priority benefit of U.S. Provisional Patent Application No. 62/198,631, filed Jul. 29, 2015. The entire disclosure and contents of the foregoing PCT Application and Provisional Application is hereby incorporated by reference in their entirety.

FIELD OF THE INVENTION

The present invention relates to thermoplastic polymer composites, including electrically conductive thermoplastic polymer composites, comprising a particulate polylactic acid (PLA), polyhydroxyalkanoate (PHA), and/or polycaprolactone (PCL) thermoplastic polyester polymers, electrically conductive materials (carbon nanofibers, graphene nanoplatelets, and/or conductive metal nanoparticulates) distributed substantially uniformly in the composites to form an electrically conductive network, as well as nanoscopic particulate fillers such as nanoscopic titanium dioxide and processing aids such as plasticizers and thermal stabilizers. The present invention also relates to the methods for preparing these and other thermoplastic polymer composites, including in the form of extruded filaments. The present invention further relates to a system for collecting these and other extruded filaments to form coils of thermoplastic polymer-based filaments to facilitate volume manufacturing and spooling of these filaments. When in the form of electrically conductive filaments, these filaments may be used to form electrically conductive articles, such as circuit boards, conductive traces (i.e., printed paths in articles which may conduct electrical current), etc., by using fused filament fabrication (FFF) techniques, may be pelletized, ground, dispersed in a liquid medium, etc., for use in selective laser sintering (SLS) techniques, inkjet printing techniques, injection molding, etc. The present invention further relates to methods for improving the crystalline structure of the PLA/PHA/PCL polymers, as well as other thermoplastic polymers, present in these articles made from these composites to enable additional post-processing methods, e.g., mechanical post-processing by drilling, sawing, sanding, polishing, etc., to alter, modify, form into parts, etc., such articles without, for example, significant softening, melting, disintegration, etc., of such articles.

BACKGROUND

Additive manufacturing (also commonly referred to as three-dimensional (3D) printing) may create physical objects, structures, articles, etc., based upon a computer-controlled program which instructs the 3D printer how to deposit successive layers of extruded material which may then fuse together to form the printed article, device, component, object, structure, part, etc. Fused deposition modeling (FDM), also referred to herein as fused filament fabrication (FFF), is one such additive manufacturing process. Other 3D printing techniques may include selective laser sintering (SLS) techniques, inkjet printing techniques, etc. When using an electrically conductive thermoplastic composite in the form of a filament, pellet, powder, etc., such 3D printing techniques may form, create, etc., printable electronics such as circuitry and power sources which may then, for example, be incorporated directly into functional printed architectures such as articles, devices, components, parts, etc.

SUMMARY

In a first broad aspect of the present invention, there is provided a composition comprising an electrically conductive polymer composite, the composite comprising:
  one or more particulate thermoplastic polyesters selected from the group consisting of polylactic acid (PLA) polymers, polyhydroxyalkanoate (PHA) polymers, and polycaprolactone (PCL) polymers in an amount of from about 65 to about 80% by weight of the composite;
  one or more electrically conductive materials selected from the group consisting of carbon nanofibers, graphene nanoplatelets, and conductive metal nanoparticulates in an amount of from about 5 to about 20% by weight of the composite;
  one or more plasticizers in an amount of from about 0.1 to about 30% by weight of the composite;
  one or more thermal stabilizers in an amount of from about 0.05 to about 5% by weight of the composite; and
  one or more nanoscopic particulate fillers in an amount of from about 0.1 to about 10% by weight of the polymer composite;
  wherein the electrically conductive components are distributed substantially uniformly in the composite to form an electrically conductive network.

In a second broad aspect of the present invention, there is provided a method for preparing a thermoplastic polymer composite, the composition of the composite comprising:
  one or more particulate thermoplastic polymers in an amount of from about 65 to about 80% by weight of the composite;
  one or more solid functional components selected from the group consisting of electrically conductive materials and structural reinforcement materials in an amount of from about 5 to about 20% by weight of the composite;
  one or more plasticizers in an amount of from about 0.1 to about 30% by weight of the composite;
  one or more thermal stabilizers in an amount of from about 0.05 to about 5% by weight of the composite; and
  one or more nanoscopic particulate fillers in an amount of from about 0.1 to about 10% by weight of the polymer composite;
the method comprising the following steps of:
  (a) combining the particulate thermoplastic polymers, the solid functional components, the nanoscopic particulate filler, the plasticizers, the thermal stabilizers in a liquid dispersing medium in which the plasticizer and the thermal stabilizer are substantially miscible to form at least one mixture;
  (b) subjecting the mixture of step (a) to sufficient agitation under low shear to provide a substantially uniform dispersion; and
  (c) substantially removing the liquid dispersing medium from the dispersion of step (b) to form the composite, wherein the particulate thermoplastic polymers, the solid functional components, and the nanoscopic particulate fillers, are distributed substantially uniformly in the composite, and substantially uniformly coated with the plasticizers and the thermal stabilizers.

In a third broad aspect of the present invention, there is provided a system for collecting an extruded filament comprising a thermoplastic polymer-based composite, the system comprising:

an extruded filament guide having a circular orifice for aligning the extruded filament with a vertically rotating hemispherical-shaped member;

a vertically rotating hemispherical-shaped member for receiving the extruded filament from the extruded filament guide and for further guiding the extruded filament to a filament collector; and a filament collector for receiving the extruded filament from the vertically rotating hemispherical-shaped member as a coil of filament.

In a fourth broad aspect of the present invention, there is provided a method for tempering an article formed from a thermoplastic polymer composite, the composite comprising:

one or more thermoplastic polymers in an amount of from about 65 to about 80% by weight of the composite; and at least one of: one or more solid functional components selected from the group consisting of electrically conductive materials and structural reinforcement materials in an amount of from about 5 to about 20% by weight of the composite; or one or more nanoscopic particulate fillers in an amount of from about 0.1 to about 10% by weight of the polymer composite;

wherein the solid functional components and/or nanoscopic particulate fillers are distributed substantially uniformly in the composite and wherein the thermoplastic polymers are in a substantially amorphous crystalline state;

the method comprising the following steps of:

(a) heating the article to a temperature above the glass transition temperature but below the softening temperature of the thermoplastic polymers; and (b) cooling the heated article at a rate in the range of from about 2° to about 5° C./min until the thermoplastic polymers has a degree of crystallization of about 30% or greater.

BRIEF DESCRIPTION OF THE DRAWINGS

The invention will be described in conjunction with the accompanying drawings, in which.

DETAILED DESCRIPTION

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "outer," "inner," "upper," "lower," "top," "bottom," "side," "front," "frontal," "forward," "rear," "rearward," "back," "trailing," "above," "below," "left," "right," "horizontal," "vertical," "upward," "downward," etc. are merely used for convenience in describing the various embodiments of the present invention. For example, the embodiments of the present invention illustrated in FIGS. 1 through 2 may be oriented in various ways.

For the purposes of the present invention, the term "thermoplastic" refers to the conventional meaning of thermoplastic, i.e., a composition, compound, material, etc., that exhibits the property of a material, such as a high polymer, that softens or melts so as to become pliable, malleable, etc., when exposed to sufficient heat and generally returns to its original condition when cooled to room temperature.

For the purposes of the present invention, the term "filament" refers to a continuous length of material which has a thread-like structure, i.e., having a length which greatly exceeds its diameter, and which may be used with fused filament fabrication (FFF) printer. A filament may be solid or may be fluid, i.e., when liquefied, molten, melted, softened, etc.

For the purposes of the present invention, the term "thermoplastic polymer" refers to those polymers which are thermoplastic. Suitable thermoplastic polymers for use herein may include, for example, one or more of: acrylate or methylmethacrylate polymers or copolymers, such as polyacrylates, polymethylmethacrylates, etc.; acrylonitrile-butadiene-styrene polymers (ABS); polyvinylidene fluoride polymers; polyurethane polymers; polyolefin polymers (e.g., polyethylene, polypropylene, etc.); polyester polymers, polyamide polymers; styrene-ethylene-butylene styrene (SEBS) polymers; polyether ether ketone (PEEK) polymers; polyphenylene sulfide (PPS) polymers; polysulfone polymers; ethylene-vinyl acetate (EVA) polymers, polyethalene-naphthalate (PEN) polymers; etc.

For the purposes of the present invention, the term "thermoplastic polyester polymer" refers to those polyester polymers which are thermoplastic. Suitable thermoplastic polyester polymers for use herein may include one or more of the following: polylactic acid (PLA) polymers; polyhydroxyalkanoate (PHA) polymers; or polycaprolactone (PCL) polymers. These thermoplastic polyester polymers may be used in pure form or as a blend with each other, and may include other additives such as plasticizers, fillers, colorants, etc.

For the purposes of the present invention, the term "polylactic acid or polylactide (PLA) polymers" refers to thermoplastic aliphatic polyesters formed from a lactic acid or a source of lactic acid, for example, renewable resources such as corn starch, sugarcane, etc. The term PLA may refer to all stereoisomeric forms of PLA including L- or D-lactides, and racemic mixtures comprising L- and D-lactides. For example, PLA may include D-polylactic acid, L-polylactic acid (also known as PLLA), D,L-polylactic acid, meso-polylactic acid, as well as any combination of D-polylactic acid, L-polylactic acid, D,L-polylactic acid and meso-polylactic acid. PLA polymers useful herein may have, for example, a number average molecular weight in the range of from about 15,000 to about 300,000 and may have melting points in the range of from about 150° to about 160° C. In preparing PLA polymers, bacterial fermentation may be used to produce lactic acid, which may be oligomerized and then catalytically dimerized to provide the monomer for ring-opening polymerization. PLA polymers may be prepared in a high molecular weight form through ring-opening polymerization of the monomer using, for example, a stannous octanoate catalyst, tin(II) chloride, etc. PLA polymers may be available in a variety of grades that differ in a molecular weight and degree of crystallinity Commercially available PLA polymers suitable for use herein may be obtained, for example, from Nature Works, Inc., such as the Ingeo™ 3, 4, and 6 series of PLA polymers, which includes: 3001D; 3052D; 3100HP; 3251D; 3260HP; 4032D; 4043D; 4044D; 4060D; 6060D; 6100D; 6201D; 6202D; 6252D; 6260D; 6302D; 6361D; 6362D; 6400D; 6752D; or 10361D.

For the purposes of the present invention, the term "polyhydroxyalkanoate (PHA) polymers" refers to thermoplastic aliphatic polyesters which may be produced by polymerization of the respective monomer hydroxy aliphatic acids (including dimers of the hydroxy aliphatic acids), by bacterial fermentation of starch, sugars, lipids, etc. PHAs may have melting points in the range of from about 40° to about 180° C. and may include one or more of: poly-beta-hydroxybutyrate (PHB) (also known as poly-3-hydroxybutyrate); poly-alpha-hydroxybutyrate (also known as poly-2-hydroxybutyrate); poly-3-hydroxypropionate; poly-3-hydroxyvalerate; poly-4-hydroxybutyrate; poly-4-hydroxyvalerate; poly-5-hydroxyvalerate; poly-3-hydroxyhexanoate; poly-4-hydroxyhexanoate; poly-6-hydroxyhexanoate; polyhydroxybutyrate-valerate (PHBV); etc., including copolymers, blends, mixtures, combinations, etc., of different PHA polymers, etc. PHAs may be synthesized by methods disclosed in, for example, U.S. Pat. No. 7,267,794 (Kozaki et al.), issued Sep. 11, 2007; U.S. Pat. No. 7,276,361 (Doi et al.), issued Oct. 2, 2007; U.S. Pat. No. 7,208,535 (Asrar et al.), issued Apr. 24, 2007; U.S. Pat. No. 7,176,349 (Dhugga et al.), issued Feb. 13, 2007; and U.S. Pat. No. 7,025,908 (Williams et al.), issued Apr. 11, 2006, the entire disclosure and contents of the foregoing documents being herein incorporated by reference.

For the purposes of the present invention, the term "polycaprolactone (PCL) polymers" refers to thermoplastic aliphatic polyesters which may be prepared by ring opening polymerization of ε-caprolactone using a catalyst such as stannous octoate and may have a melting point about 60° C.

For the purposes of the present invention, the term "amorphous" refers to a solid which is not crystalline, i.e., has no repetitive lattice structure which is characteristic of a crystalline state.

For the purposes of the present invention, the term "crystalline" refers to a solid which has a repetitive lattice structure which is characteristic of a crystalline state.

For the purposes of the present invention, the term "electrically conductive" refers to materials which have the property, capability, etc., to conduct an electric current. Electrically conductive materials may include metals such as copper, silver, etc., carbon materials such as carbon nanofibers, graphene nanoplatelets, as well as combinations thereof.

For the purposes of the present invention, the term "solid functional components" refers to one or more of: solid electrically conductive materials; or solid structural reinforcement materials.

For the purposes of the present invention, the term "electrically conductive materials" refers to one or more of: carbon nanofibers; graphene nanoplatelets; or conductive metal nanoparticulates.

For the purposes of the present invention, the term "electrically conductive network" refers to the conductive network that is formed by the electrically conductive materials present in the composite.

For the purposes of the present invention, the term "carbon material" refers to materials made of carbon, and which may function as one or more of: electrically conductive materials; structural reinforcement materials; nanoscopic particulate fillers; etc. Carbon materials may include one or more of: carbon nanofibers (including carbon-based nanotubes); graphite; graphite flakes; carbon black; graphene; graphene-like materials; (e.g., reduced graphene oxide, functionalized graphene, graphene oxide, partially reduced graphene oxide, etc.); etc.

For the purposes of the present invention, the term "carbon nanofibers (CNFs)" refers to cylindrical nanostructures having graphene layers arranged as stacked cones, cups, plates, etc. Carbon nanofibers with graphene layers wrapped and arranged as cylinders are commonly referred to as carbon nanotubes. Carbon nanofibers (CNFs) may be produced either in a vapor-grown form or by electrospinning. Vapor-grown carbon nanofibers may be in the form of a free-flowing powder (e.g., wherein 99% of the carbon mass is in a fibrous form) known as multi-walled carbon nanotubes (MWCN) or stacked-cup carbon nanotubes (SCCNT) where the graphene plane surface is canted from the fiber axis, thus exposing the plane edges present on the interior and exterior surfaces of the carbon nanotubes, and may be produced by the floating catalyst method in the vapor phase by decomposing carbon-containing gases, such as methane, ethane, acetylene, carbon monoxide, benzene, coal gas, etc., in presence of floating metal catalyst particles inside a high-temperature reactor. Ultrafine particles of the catalyst may be either carried by the floating gas into the reactor or produced directly in the reactor by decomposing of the catalyst precursor. One such catalyst is iron, which may be produced by the decomposition of ferrocene. However other metals alone or in combination may be utilized as well as catalysts. Carbon nanofibers suitable for use herein may have an average diameter in the range of from about 20 to about 150 nm (e.g., from about 60 to about 150 nm) depending upon the grade and may have lengths of, for example, in the range of from about 3 to about 100 microns (e.g., about 30 to about 100 microns). Carbon nanofibers may undergo post treatment after production, including removing impurities on their surface, such as tar and other aromatic hydrocarbons, by a process called pyrolytic stripping, that involves heating, for example, to about 1000° C. in a reducing atmosphere. Sometimes heating, for example, to 3000° C. may be used to impart higher tensile strength and tensile modulus by graphitizing the surface of the carbon fibers. However, the heat treatment which may achieve an improved combination of mechanical and electrical properties may be found at a temperature of, for example, about 1500° C. In embodiments of the composites of the present invention, commercially available sources of suitable carbon nanofibers may be obtained, for example, from Applied Sciences Inc. as grade PR-24XT-LHT, PR-25XT-LHT as well as Aldrich product 719803, Grupo Antolin carbon nanofibers (GANF1 and GANF3), etc.

For the purposes of the present invention, the term "graphene-like material" refers to a material, substance, etc., which may have a layered structure the same or similar to graphene. Graphene-like materials may include one or more of: graphene; functionalized graphene; graphene oxide; partially reduced graphene oxide; graphite flakes; graphene nanoplatelets; etc.

For the purposes of the present invention, the term "graphene" refers to pure or relatively pure carbon in the form of a relatively thin, nearly transparent sheet, which is one atom in thickness (i.e., a monolayer sheet of carbon), or comprising multiple layers (multilayer carbon sheets), having a plurality of interconnected hexagonal cells of carbon atoms most of which are present in sp² hybridized state and which form a honeycomb like crystalline lattice structure. In addition to hexagonal cells, pentagonal and heptagonal cells (defects), versus hexagonal cells, may also be present in this crystal lattice.

For the purposes of the present invention, the term "functionalized graphene" refers to graphene which has incorporated into the graphene lattice a variety chemical functional groups such as —OH, —COOH, —NH$_2$, etc., in order to modify the properties of graphene.

For the purposes of the present invention, the term "graphene oxide" (also known as "graphitic acid" and "graphite oxide") refers interchangeably to a compound of carbon, oxygen, and hydrogen which may exist in variable ratios of these three atoms, and which may be obtained by treating graphite with strong oxidizers.

For the purposes of the present invention, the term "partially reduced graphene oxide" refers to graphene oxide that, upon reduction, contains from about 5 about 30% oxygen by weight of the graphene oxide.

For the purposes of the present invention, the term "graphene nanoplatelets (NGPs)" and "nanosheets" refer interchangeably to platelets of graphene, and may also refer to platelets and sheets comprised of other graphene-like materials such as graphene oxide, partially reduced graphene oxide, functionalized graphene, etc., having a thickness in the range of from about 0.34 to about 100 nm and may include one material or in any combination.

For the purposes of the present invention, the term "flakes" refers to particles in which two of the dimensions (i.e., width and length) are significantly greater compared to the third dimension (i.e., thickness).

For the purposes of the present invention, the term "nanoscopic" refers to materials, substances, structures, etc., having a size in at least one dimension (e.g., diameter, thickness, etc.) of from about 1 to about 1000 nanometers, such as from about 1 to about 100 nanometers. Nanoscopic materials, substances, structures, etc., may include, for example, nanoplatelets, nanotubes, nanowhiskers, flakes, etc.

For the purposes of the present invention, the term "closely-spaced stack-like arrangement" refers to an atomic arrangement in a crystalline phase wherein covalently or ionically bonded atoms form layered structures, which arrange themselves in close proximity and parallel to each other. These layers are weakly bound by Van der Waals forces.

For the purposes of the present invention, the term "conductive metal nanoparticulates" refers to nanoscopic particulates (e.g., nanoparticles, nanorods, nanowhiskers, etc.) which are formed from electrically conductive metals such as silver, copper, nickel, aluminum, etc., or combinations such metals, and which may be dispersed in a medium such as a paste, paint, ink, etc.

For the purposes of the present invention, the term "impact modifiers" refers to additives which may increase a composite's resistance against breaking under impact conditions, and which may include, for example, one or more of: polymers or copolymers of an olefin, for example, ethylene, propylene, or a combination of ethylene and propylene, with various (meth)acrylate monomers and/or various maleic-based monomers; copolymers derived from ethylene, propylene, or mixtures of ethylene and propylene, as the alkylene component, butyl acrylate, hexyl acrylate, propyl acrylate, a corresponding alkyl(methyl)acrylates or a combination of the foregoing acrylates, for the alkyl(meth) acrylate monomer component, with acrylic acid, maleic anhydride, glycidyl methacrylate or a combination thereof as monomers providing an additional moieties (i.e., carboxylic acid, anhydride, epoxy); block copolymers, for example, A-B diblock copolymers and A-B-A triblock copolymers having of one or two aryl alkylene blocks A, which may be polystyrene blocks, and a rubber block, B, which may be derived from isoprene, butadiene or isoprene and butadiene; etc.

For the purposes of the present invention, the term "thermal stabilizers" refer to additives to a composite which improves the composite's resistance to heat, resulting in sustaining composite's properties at higher temperatures compared to materials without the stabilizer. Suitable thermal stabilizers may include, for example, one or more phosphites or phosphonites such as: triphenyl phosphite, diphenylalkyl phosphite; phenyldialkyl phosphite; tris(nonylphenyl)phosphite (TNPP); trilauryl phosphite; trioctadecyl phosphite; distearylpentaerythritol diphosphite; tris(2,4-di-test-butylphenyl)phosphite; diisodecylpentaerythritol diphosphite; bis(2,4-di-tert-butylphenyl)pentaerythritol diphosphite; bis(2,4-di-cumylphenyl)pentaerythritol diphosphite; bis(2,6-di-tert-butyl-4-methylphenyl)pentaerythritol diphosphite; diisodecyloxypentaerythritol diphosphite; bis (2,4-di-tert-butyl-6-methylphenyl)-pentaerythritol diphosphite; bis(2,4,6-tris(tert-butylphenyl)pentaerythritol diphosphite; tristearyl sorbitoltriphosphite; tetrakis(2,4-di-tert-butylphenyl)-4,4'-biphenylene diphosphonite, 6-isooctyloxy-2,4,8,10-tetra-tert-butyl-12H-dibenz[d,g]-1, 3,2-dioxaphosphocine; bis(2,4-di-tert-butyl-6-methylphenyl)methyl phosphite; bis(2,4-di-tert-butyl-6-methylphenyl) ethyl phosphite; 6-fluoro-2,4,8,10-tetra-tert-butyl-12-methyl-dibenz[d,g]-1,3,2-dioxaphosphocine; 2,2',2"-nitrilo-[triethyltris(3,3',5,5'-tetra-tert-butyl-1,1'-biphenyl-2,2'-diyl) phosphite]; 2-ethylhexyl(3,3',5,5'-tetra-tert-butyl-1,1'-biphenyl-2,2'-diyl)phosphite; 5-butyl-5-ethyl-2-(2,4,6-tri-tert-butylphenoxy)-1,3,2-dioxaphosphirane; bis(2,6-di-tert-butyl-4-methylphenyl)pentaerythritol diphosphite; triphenylphosphine (TPP); trialkylphenylphosphine; bisdiphenylphosphino-ethane; trinaphthylphosphine; etc., as well as poly(propylene glycol)diglycidyl ether. See U.S. Pat. No. 9,029,440 (Meyer et al.), issued May 12, 2015, the entire contents and disclosure of which is herein incorporated by reference. Particularly suitable as thermal stabilizers for use herein are one or more of: tris(nonylphenyl)phosphite (TNPP); triphenylphosphine (TPP); (tris(2,4-di-tert-butylphenyl) phosphite) (e.g., Irgafos®168); or poly(propylene glycol)diglycidyl ether.

For the purposes of the present invention, the term "melt strength" refers to the resistance of the melted polymer composite to stretching and reflect how strong the polymer composite is when in a molten state. Melt strength of the melted polymer composite is related to the molecular chain entanglements of the polymer in the composite and its resistance to untangling under strain. The polymer properties affecting such resistance to untangling include, for example, molecular weight, molecular-weight distribution (MWD), molecular branching, etc. As each of these properties increase, melt strength of the polymer may be improved.

For the purposes of the present invention, the term "liquid" refers to a non-gaseous fluid composition, compound, substance, material, etc., which may be readily flowable at the temperature of use (e.g., room temperature) with little or no tendency to disperse and with a relatively high compressibility.

For the purposes of the present invention, the term "extrudable" refers to composition, compound, substance, material, etc., which is sufficiently malleable, pliable, thermoplastic, etc., such that it may be forced through an extrusion orifice or die.

For the purposes of the present invention, the term "fusible" refers to a thermoplastic composition, substance, material, etc., which may be fused, sintered, joined together, combined, etc., by the application of heat.

For the purposes of the present invention, the term "three-dimensional (3D) printable material" refers to a thermoplastic composition, substance, material, etc., which may be formed into a three-dimensional (3D) article, device, component, object, structure, part, etc., by a three-dimensional (3D) printing technique.

For the purposes of the present invention, the term "three-dimensional (3D) printing" (also known as "additive printing" and "additive manufacturing") refers to any of various processes, techniques, etc. (e.g., coating, spraying, depositing, applying, extruding, fusing, sintering, etc., or any combination thereof) for making a three-dimensional (3D) article, device, object, component structure, part, etc., from a three-dimensional (3D) model, other electronic data source (e.g., computer assisted drawing (CAD) program file, stereolithographic (STL) file, etc.), etc., through additive processes in which successive layers of material (e.g., filaments, films, powders, particles, pellets, etc.) may be laid down, for example, under computer control. Three-dimensional (3D) printing processes, techniques, etc., may include, for example, fused filament fabrication (FFF), selective laser sintering (SLS) (also referred to herein interchangeably as selective laser melting (SLM)), inkjet head 3D printing (also referred to herein interchangeably as inkjet 3D printing), etc.

For the purposes of the present invention, the term "fused filament fabrication (FFF) (also referred to herein interchangeably as fused deposition modeling (FDM), fused extrusion deposition (FED), or Plastic Jet Printing (PJP))" refers to a three-dimensional (3D) printing technique wherein a thermoplastic filament (preformed or formed in situ) is extruded from an extrusion (printing) nozzle (also referred to interchangeably as a "printing head," or "extruder") in layers which, due to being liquefied, molten, softened, melted, etc., adhere (fuse) together to form the three-dimensional (3D) article, device, component, object, structure, part, etc.

For the purposes of the present invention, the term "fused filament fabrication (FFF) printer" refers to any three-dimensional (3D) printer which operates by using a fused filament fabrication (FFF) technique.

For the purposes of the present invention, the term "nanoscopic particulate fillers" refers to nanoscopic particulate additives (e.g., nanoparticles, nanopowders, etc.) which may alter a composite's mechanical properties, physical properties, chemical properties, etc., and which may include, for example, one or more of: titanium oxides; magnesium oxide; hydrous magnesium silicate; aluminum oxides; silicon oxides; calcium carbonate; clay; chalk; boron nitride; limestone; diatomaceous earth; mica; glass quartz; ceramic and/or glass microbeads; metal or metal oxide fibers and particles; Magnetite®; magnetic Iron(III) oxide; graphene nanoplatelets; graphene oxide; carbon fibers; carbon nanotubes; etc.

For the purposes of the present invention, "plasticizer" refers to the conventional meaning of this term as an additive which, for example, softens, makes more flexible, malleable, pliable, plastic, etc., a polymer, thus providing flexibility, pliability, durability, etc., which may also decrease the melting and the glass transition temperature of the polymer, and which may include, for example, one or more of: tributyl citrate; acetyl tributyl citrate; diethyl phthalate; glycerol triacetate; glycerol tripropionate; triethyl citrate, acetyl triethyl citrate; phosphate esters (e.g., triphenyl phosphate, resorcinol bis(diphenyl phosphate), olicomeric phosphate, etc.); long chain fatty acid esters; aromatic sulfonamides; hydrocarbon processing oil; propylene glycol; epoxy-functionalized propylene glycol; polyethylene glycol; polypropylene glycol; partial fatty acid ester (Loxiol GMS 95); glucose monoester (Dehydrat VPA 1726); epoxidized soybean oil; acetylated coconut oil; linseed oil; epoxidized linseed oil; etc.

For the purposes of the present invention, the term "liquid dispersing medium" refers to a liquid which may dissolve, suspend, etc., another material which may be a solid, gas, or liquid. The liquid dispersion medium may be solvents, mixtures of solvents, as well as any other substance, composition, compound, etc., which exhibits liquid properties at room or elevated temperatures, etc., and which may be also relatively volatile. Suitable for use as the liquid dispersing medium in the method of the present invention for preparing electrically conductive polymer composites may include one or more of: acetone, ethanol, methanol, chloroform, dichloromethane, etc.

For the purposes of the present invention, the term "blend," "blending," and similar words and/or phrases refers to combining, mixing together, unifying, etc., a plurality of components, compounds, compositions, substances, materials, etc.

For the purposes of the present invention, the term "substantially uniform" refers to a composition, dispersion, material, substance, etc., which is substantially uniform in terms of composition, texture, characteristics, properties, etc.

For the purposes of the present invention, the term "heat sink refers to a passive heat exchanger which cools a device by dissipating heat into the surrounding medium and which may be capable of efficient transfer and dissipation of heat produced by other components (e.g., electronic, etc.).

For the purposes of the present invention, the term "3D current conductors" refers to three-dimensional (3D) structures designed to conduct electrical current.

For the purposes of the present invention, the term "solar cell grid collectors" refers to the part of the solar cell, such as is made of metal or other conductive material, and which collects charges generated in/by semiconductor part of a solar cell.

For the purposes of the present invention, the term "volumetric resistivity" (also known interchangeably as "electrical resistivity," "resistivity," "specific electrical resistance," "volume resistivity," etc.) refers to the degree to which a material resists the flow of electrical current, and is measured herein in units of Ohm×cm.

For the purposes of the present invention, the term "dispersion" refers to a two (or more)-phase system which may be for, example, in the form of an suspension, colloid, etc., in which solid materials (e.g., solid particulates, solid particles, solid powders, etc.) are dispersed, suspended, etc., in the external or continuous (bulk) phase (e.g., the liquid dispersion medium, etc.).

For the purposes of the present invention, the term "flame/fire retardant" refers to a composition, compound, substance, etc., which makes the treated material therewith resistant to fire, flame, burning, etc.

For the purposes of the present invention, the term "structural reinforcement materials" refers to additives which may be use to improve the mechanical strength of the polymer composite. Structural reinforcement materials useful herein may include, for example, one or more of: glass fibers; metal or metal oxide fibers; clay; talc; chalk; boron nitride; magnesium hydroxide, magnesium carbonate, diatomaceous earth; mica; glass quartz; ceramic and/or glass microbeads or spheres; graphene nanoplatelets; graphene oxide; carbon fibers; carbon nanotubes; etc.

For the purposes of the present invention, the term "low shear" refers to shear forces sufficiently low and gentle enough such that the structural integrity of the various components in the composite, such as the carbon nanofibers, etc., remains unchanged or substantially unchanged.

For the purposes of the present invention, the term "substrate" refers to a base component of a composite and wherein other components may be blended with it, placed on its surface, etc.

For the purposes of the present invention, the term "powder" refers to a solid material which is comprise of a large number of fine particles.

For the purposes of the present invention, the term "film" refers to a relatively thin continuous layer of material, and which may be supported on or by other materials, or which may be unsupported on or by other materials.

For the purposes of the present invention, the term "composite" refers to a multicomponent composition wherein each component has, imparts, etc., a distinct function, property, etc., to the multicomponent composition, and wherein each component is distributed uniformly or substantially uniformly throughout the multicomponent composition.

For the purposes of the present invention, the term "exfoliation" refers to the chemical and/or physical process of separation of layers of a material (e.g., graphite flakes).

For the purposes of the present invention, the term "percolation" refers to the process of formation of a continuous three-dimensional (3D) network.

For the purposes of the present invention, the term "ultrasonic" refers to a sound wave frequency, as well as waves generated at that frequency, devices generating such a wave frequency, etc., which is about 20 kHz or greater.

For the purposes of the present invention, the term "cavitation" refers to the formation of vapor (gaseous) cavities in a liquid.

For the purposes of the present invention, the term "sonication" refers to applying sound energy (e.g., sound waves) to agitate, stir, mix, etc., for example, one or more liquids, solid particles, etc. Sonication may also be used to facilitate the process of exfoliation.

For the purposes of the present invention, the term "thin film deposition" refers to the technique of applying (depositing) a thin film to or on the surface of a substrate, material, etc.

For the purposes of the present invention, the term "solid" refers to non-volatile, non-liquid components, compounds, materials, etc., which may be in the form of, for example, particulates, particles, powders, etc.

For the purposes of the present invention, the term "liquid" refers to a non-gaseous fluid components, compounds, materials, etc., which may be readily flowable at the temperature of use (e.g., room temperature) with little or no tendency to disperse and with a relatively high compressibility.

For the purposes of the present invention, the term "room temperature" refers to refers to the commonly accepted meaning of room temperature, i.e., an ambient temperature of from about 20° to about 25° C.

For the purposes of the present invention, the term "printed electronic circuitry" refers to electronic circuitry created by various printing methods or techniques such as, for example, flexography, gravure printing, offset lithography, fused filament fabrication (FFF) techniques, selective laser sintering (SLS) techniques, inkjet printing, etc.

For the purposes of the present invention, the term "flexible circuits" (also known as "flex circuits," flexible PCBs," flexi-circuits," etc.) refers to circuits formed from a thin insulating polymer film having conductive circuit patterns affixed thereto and which may be supplied with a thin polymer coating to protect the conductor circuits formed.

For the purposes of the present invention, the term "3D current conductors" refers to three-dimensional (3D) structures designed to conduct electrical current.

For the purposes of the present invention, the term "solar cell grid collectors" refers to the part of the solar cell, such as is made of metal or other conductive material, and which collects charges generated in/by semiconductor part of a solar cell.

For the purposes of the present invention, the term "lightening surge protectors" refers to a device connected upstream from an electrically powered appliance and which mitigates, moderates, lessens, etc., any perturbations of the supply line characteristics (e.g., overvoltage) due to, for example, a lightening event.

For the purposes of the present invention, the term "electromagnetic interference (EMI) shielding" refers to shielding against electromagnetic disturbances, such as radiofrequency interference.

For the purposes of the present invention, the term "flexible displays" refers to a display capable of being deformed, (e.g., by bending) and which is beyond the pliability of other conventional displays.

For the purposes of the present invention, the term "photovoltaic devices" refers to devices such as solar panels, solar cells, etc., which generate electrical power by converting solar radiation into direct current electricity.

For the purposes of the present invention, the term "smart labels" refers to radiofrequency identification (RFID) labels which, for example, may be embedded as inlays inside label material, and then, for example, printing bar code and/or other visible information on the surface of the label.

For the purposes of the present invention, the term "radiofrequency identification (RFID) tags" refers to tags attached to objects that contain electronically stored information, and which, through use of radiofrequency electromagnetic fields, permit automatic identifying and tracking of such tags.

For the purposes of the present invention, the term "module" refers to an isolatable element that performs a defined function and has a defined interface to other elements. These modules may be implemented in hardware, a combination of hardware and software, firmware, wetware (i.e., hardware with a biological element) or a combination thereof, all of which are considered to be functionally (e.g., behaviorally) equivalent.

For the purposes of the present invention, the term "comprising" means various compounds, components, ingredients, substances, materials, layers, steps, etc., may be conjointly employed in embodiments of the present invention. Accordingly, the term "comprising" encompasses the more restrictive terms "consisting essentially of" and "consisting of."

For the purposes of the present invention, the terms "a" and "an" and similar phrases are to be interpreted as "at least one" and "one or more." References to "an" embodiment in this disclosure are not necessarily to the same embodiment.

For the purposes of the present invention, the term "and/or" means that one or more of the various compositions, compounds, ingredients, components, elements, members, capabilities, steps, etc., may be employed in embodiments of the present invention.

Description

In order to the enable the successful three-dimensional (3D) printing of thermoplastic composites, in particular electrically conductive thermoplastic composites, not only does melt rheology need to be taken into account, but also certain mechanical properties of the materials present in these composites in their solid state. In other words, a complex combination of the materials in such composites delivering the right combination of mechanical properties in the solid state as well as suitable melt viscoelastic properties may be required to enable successful three-dimensional (3D) printing of such composites. In addition, in carrying out injection molding, fused filament fabrication (FFF) techniques, and selective laser sintering (SLS) fabrication techniques, etc., with such composites, the viscoelastic behavior of the material present in such composites when in a molten state may also play a significant role in successfully carrying out such techniques.

One electrically conductive material which may be incorporated into such composites are carbon nanofibers. Carbon nanofibers (CNFs) may exist as discontinuous, highly graphitic materials, as well as being highly compatible with certain polymer processing techniques, and thus may be dispersed in isotropic or anisotropic mode, i.e., these dispersed carbon nanofibers may be aligned or unaligned. CNFs may exhibit exceptional mechanical properties, may have relatively high electrical and thermal conductivities, and may be compatible with wide range of materials. Carbon nanofiber surfaces may also be functionalized to improve their compatibility with the polymer matrix present in the composite, or to render such carbon nanofibers more useful for specific applications. When incorporated into thermoplastic polymer-containing composites, these carbon nanofibers (along with any other electrically conductive components such as graphene nanoplatelets and/or conductive metal nanoparticulates) may increase the tensile strength, compression strength, Young's modulus, interlaminar shear strength, fracture toughness, as well as vibration damping of the polymer-containing composite.

Embodiments of the present invention relate to electrically conductive polymer composites comprising: thermoplastic polyester polymers which are one or more of polylactic acid (PLA) polymers, polyhydroxyalkanoate (PHA) polymers or polycaprolactone (PCL) polymers (referred to hereafter collectively for convenience as "PLA/PHA/PCL polymers"); one or more electrically conductive components selected from the group consisting of carbon nanofibers, graphene nanoplatelets, and conductive metal (e.g., silver, copper, nickel, aluminum, etc.) nanoparticulates; nanoscopic particulate fillers such as titanium dioxide, etc.; as well as processing aids such as plasticizers, thermal stabilizers, etc. These electrically conductive composites comprising such PLA/PHA/PCL polymers enable the printing, fabrication, etc., of highly conductive traces (i.e., printed paths which may conduct electrical current), wires, parts, etc., compared to prior conductive polymer composites which are useful primarily for electrostatic dissipation purposes. These conductive prior polymer composite materials may deliver much lower conductivity (i.e., have higher resistivity) which may not suitable for printing circuits, wires and other functional parts of electronic devices, where higher conductivity may be required. For electrostatic dissipation quite low conductivity, high resistivity on kilo or even Mega Ohms scale is good enough. By contrast, embodiments of the electrically conductive polymer composites of the present invention have much higher electrical conductivity, for example, volumetric resistivity of about 1 Ohm×cm or below, such as about 0.6 Ohm×cm or below.

In embodiments of the present inventions, the electrically conductive polymer composite may comprise (by weight of the composite): from about 65 to about 80% (such as from about 75 to about 80%) of one or more PLA/PHA/PCL polymers; from about 5 to about 15% (such as from about 8 to about 13%) of one or more electrically conductive components selected from the group consisting of carbon nanofibers, graphene nanoplatelets, and/or conductive metal nanoparticulates; from about 0.1 to about 30% (such as from about 5 to about 15%) of one or more plasticizers; from about 0.05 to about 5% (such as from about 0.1 to about 1%) of one or more thermal stabilizers; and from about 0.1 to about 10% (such as from about 1 to about 5%) of one or more nanoscopic particulate fillers. In some embodiments, the electrically conductive components may comprise carbon nanofibers, with or without graphene nanoplatelets, with or without conductive metal (e.g., silver, copper, nickel, aluminum, etc.) nanoparticulates. In some embodiments, these electrically conductive polymer composites may also optionally include one or more of: UV stabilizers, fire retardants, impact modifiers, structural reinforcement agents, melt strength enhancers, dispersants, binders, etc. Embodiments of compositions of these electrically conductive polymer composites may also include one or more solvents in which the composites are dispersed to form a liquid composition for use, for example, in the ink-jet printing applications, methods, etc.

In one such embodiment of the present invention, an electrically conductive carbon nanofiber-containing composite may comprise (by weight of the composite): 77.7% PLA polymer (6252D Nature Works, Inc); 12.4% carbon nanofibers (Applied Sciences Inc, grade PR-24XT-LHT); 0.4% graphene nanoplatelets (AO2 grade, Graphene Laboratories, Inc.); 7.6% tributyl citrate (Alfa Aesar L12639) as the plasticizer; 0.2% tris(nonylphenyl)phosphite (441805 Aldrich) as the thermal stabilizer; and 1.6% titanium dioxide (Aldrich 718467) as the nanoscopic particulate filler.

Figure 1:
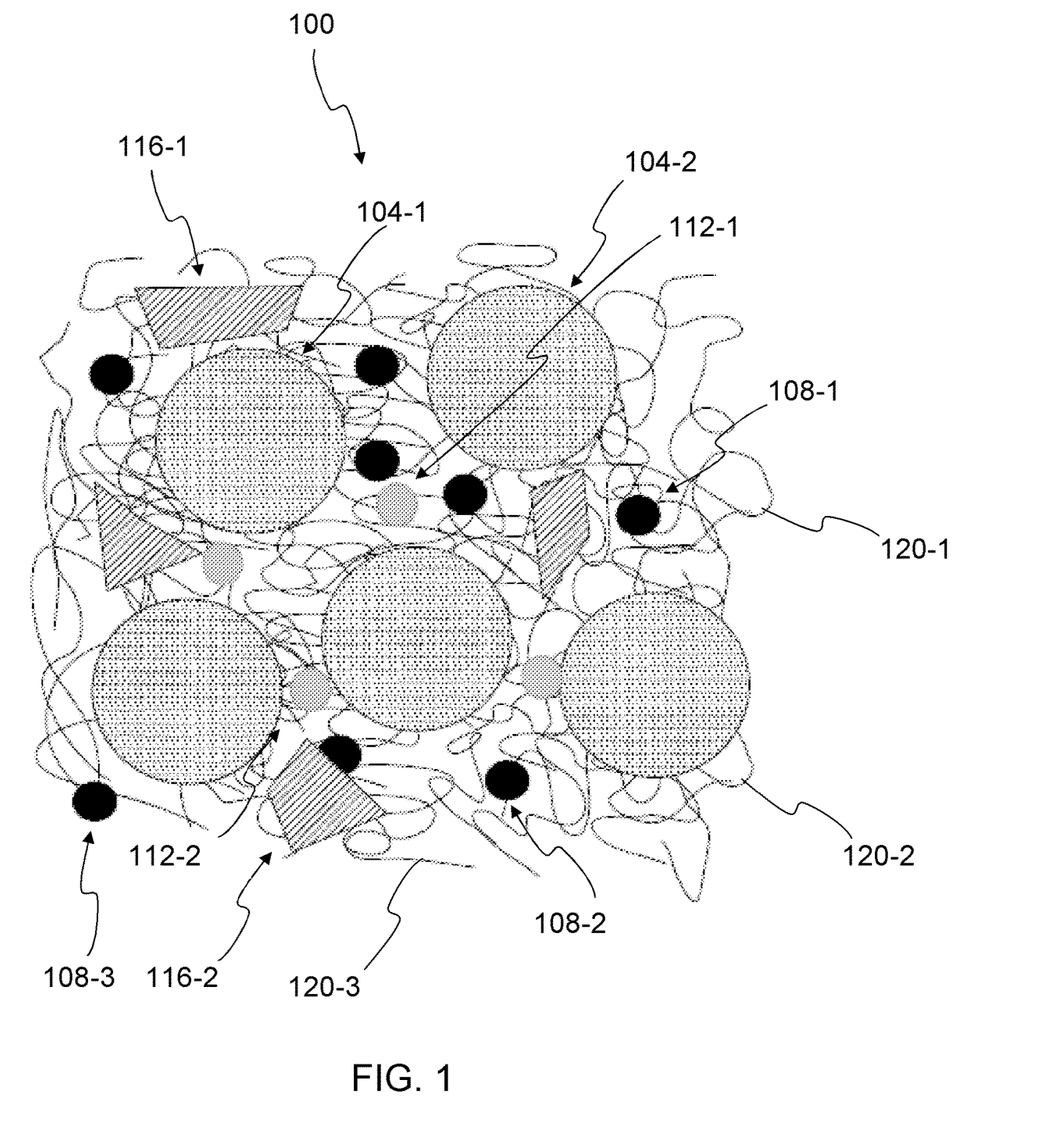
FIG. 1 schematically illustrates what is believed to be the structure of embodiments of the electrically conductive polymer composite of the present invention.

A unique feature of the embodiments of the electrically conductive polymer composites of the present invention is the conductive network formed by electrically conductive components (carbon nanofibers, graphene nanoplatelets and/or conductive metal nanoparticulates) being distributed substantially uniformly in the composite during the process for preparing same, and which is partially or completely preserved during subsequent processing, for example, by extrusion of into filaments. The plasticizers and thermal stabilizers, which function as processing aids, may also aid in adherence of some or all of these electrically conductive components to each other and the particulate thermoplastic polyesters and/or the nanoscopic particulate fillers. FIG. 1 provides a schematic illustration of what is generally believed to be the three-dimensional structure of these composites prior to subsequent processing, for example, by extrusion into filaments. As shown in FIG. 1, the composite, indicated generally as 100, includes particulate thermoplastic polyesters represented by larger circles, such as indicated by arrows 104-1 and 104-2. Composite 100 is also shown as comprising conductive metal nanoparticulates which are represented as smaller black circles, such as indicated by arrows 108-1, 108-2, and 108-3. Composite 100 is further shown as comprising nanoscopic particulate fillers which are represented as smaller gray circles, such as indicated by arrows 112-1 and 112-2. Composite 100 is further shown as comprising graphene platelets which are represented as irregular shaped cross-hatched structure, such as indicated by arrows 116-1 and 116-2. Composite 100 is further shown as comprising carbon nanofibers which are represented by squiggly lines, several of which are indicated by 120-1, 120-2, and 120-3. The combination of carbon nanofibers 120, graphene platelets 116, and conductive metal nanoparticulates 108 provide the electrically conductive network for composite 100. Although not shown in FIG. 1, processing aids, in particular the plasticizers and thermal stabilizers, may be present (partially or completely) on, coated on, cover, etc., one or more of the surfaces of the particulate thermoplastic polyesters 104, conductive metal nanoparticulates 108, nanoscopic particulate fillers 112, graphene platelets 116, and carbon nanofibers 120 such that one or more of the conductive metal nanoparticulates 108, graphene platelets 116, and carbon nanofibers 120 may be adhered to each other or to one or more of the particulate thermoplastic polyesters 104 and/or nanoscopic particulate fillers 112.

Embodiments of the present invention also relate to preparing thermoplastic polymer composites (including the above-described electrically conductive polymer composites), as well as subsequent processing of these composites to provide, for example, extruded materials, such as filaments. In this method, a mixture may be formed comprising the particulate thermoplastic polymers, all or a portion of the solid functional components (i.e., electrically conductive materials, and/or structural reinforcement materials), all or a portion of the nanoscopic particulate fillers), and all or a portion of the processing additives (such as the plasticizers, and/or thermal stabilizers, etc.) dispersed in one or more liquid dispersing media (which may be comprised of one or more miscible solvents) and in which the processing additives are soluble or otherwise miscible. For example, in one embodiment, a first mixture may be formed in which the thermoplastic polymers, the solid functional components, and a portion of the plasticizer(s), are dispersed in a first portion of liquid dispersing medium, while a second mixture may be formed comprising the remaining portion of the plasticizer(s), the nanoscopic particulate filler(s), and the thermal stabilizer(s) dispersed in a second portion of liquid dispersing medium. The liquid dispersing medium used for the first and second mixtures may be the same or different, but should be miscible with each other. The combination of the particulate thermoplastic polymers, the solid functional components, the nanoscopic particulate filler, the plasticizers, and the thermal stabilizers in the liquid dispersing medium (either as one mixture, or as a first mixture and second mixture as described below which is then combined together) may then be agitated sufficiently under low shear to provide a substantially uniform dispersion. After the liquid dispersing medium is substantially removed from the substantially uniform dispersion, what remains is a composite such that the solid components (i.e., electrically conductive materials, structural reinforcement materials, and/or nanoscopic particulate fillers) are substantially uniformly distributed in the composite, with the particulate thermoplastic polymers and these solid components within the composite being substantially uniformly coated with the processing additives (e.g., the plasticizers and/or thermal stabilizers). The resulting composite may also be subsequently processed, for example, by extrusion into filaments, such as at a temperature in the range of from about 150° to about 350° C.

In one embodiment of this method, a first mixture may be formed comprising the particulate PLA/PHA/PCL polymers, electrically conductive materials such as carbon nanofibers, graphene nanoplatelets, and/or conductive metal nanoparticulates, and a portion of the plasticizer dispersed in a first portion of liquid dispersing medium which is miscible with the plasticizer. A second mixture may also be formed comprising the remaining portion of the plasticizer, the nanoscopic particulate filler(s), and thermal stabilizer(s) dispersed in a second portion of the liquid dispersing medium which is also miscible with the thermal stabilizer. The first and second mixtures may then be combined with sufficient agitation under low shear to provide a substantially uniform dispersion. After the liquid dispersing medium is substantially removed from the substantially uniform dispersion, the resulting composite comprises the particulate PLA/PHA/PCL polymers and the solid components (i.e., the electrically conductive materials such as carbon nanofibers, graphene nanoplatelets, and/or conductive metal nanoparticulates and/or nanoscopic particulate fillers), all distributed substantially uniformly within the composite, along with the particulate PLA/PHA/PCL polymers and these solid components being substantially uniformly coated with the processing additives (e.g., the plasticizers and/or thermal stabilizers). The resulting composite may also be subsequently processed, for example, by extrusion into filaments, such as at a temperature in the range of from about 170° to about 210° C.

One such embodiment of a method for preparing/compounding a conductive polymer composite as well as forming the composite by extruding and receiving/collecting that composite in a filamentary form, may comprise the following steps of:

(1) particulate thermoplastic polyester (e.g., PLA/PHA/PCL polymer powder), carbon nanofibers and graphene nanoplatelets may be mixed with a liquid dispersion medium (e.g., acetone) in which the plasticizer (e.g., tributyl citrate) and thermal stabilizer (e.g., tris(nonylphenyl)phosphite (TNPP)) are miscible such as acetone (e.g., 200 g of carbon nanofibers per about 5 liters of acetone) in a round bottomed flask either manually with a stirring rod or with a mechanical stirrer. The total amount of tributyl citrate plasticizer required is divided into portions. For example, four fifths (⅘) of the total amount plasticizer may be added to the flask containing premixed carbon nanofibers and graphene nanoplatelets in acetone with the resulting mixture again being well mixed until homogeneity. The remaining one fifth (⅕) of tributyl citrate plasticizer is used in step 2, as described below.

(2) In a separate container, a particulate nanoscopic filler (e.g., titanium dioxide) is suspended in the acetone along with remaining one fifth (⅕) portion of the tributyl citrate plasticizer and tris(nonylphenyl)phosphite (TNPP) as the thermal stabilizer. This mixture may be sonicated in the ultrasonic bath for 15 min until a uniform or substantially uniform stable mixture is achieved.

(3) The resulting mixture from step 2 is then added to the mixture from step 1 with the resulting dispersion being well agitated at low shear (e.g., manually or with a mechanical stirrer) until a uniform or substantially 6 uniform dispersion is achieved.

(4) The flask containing the dispersion from step 3 may then be hooked onto a rotovap and stirred at the ambient pressure and temperature for 15 min.

(5) The acetone in the stirred dispersion from step 4 is removed or substantially removed at the elevated temperature (e.g., in the range of from about 20° to about 55° C. and reduced pressure (e.g., gradually from atmospheric pressure to about 60 mbar) yielding visually dry composite (e.g., in from about 2 to about 3 hours.).

(6) The resulting polymer composite mixture from step 5 is dried in the ventilated oven, for example, at 80° C. at least 4 hours.

(7) The dry polymer composite mixture from step 6 may then be extruded with a single screw extruder to yield an extruded filament, at an extrusion temperature kept in the range of from about 160° to about 220° C. (such as in the range of from about 170° to about 210° C.) at a die exit of the extruder.

Figure 2:
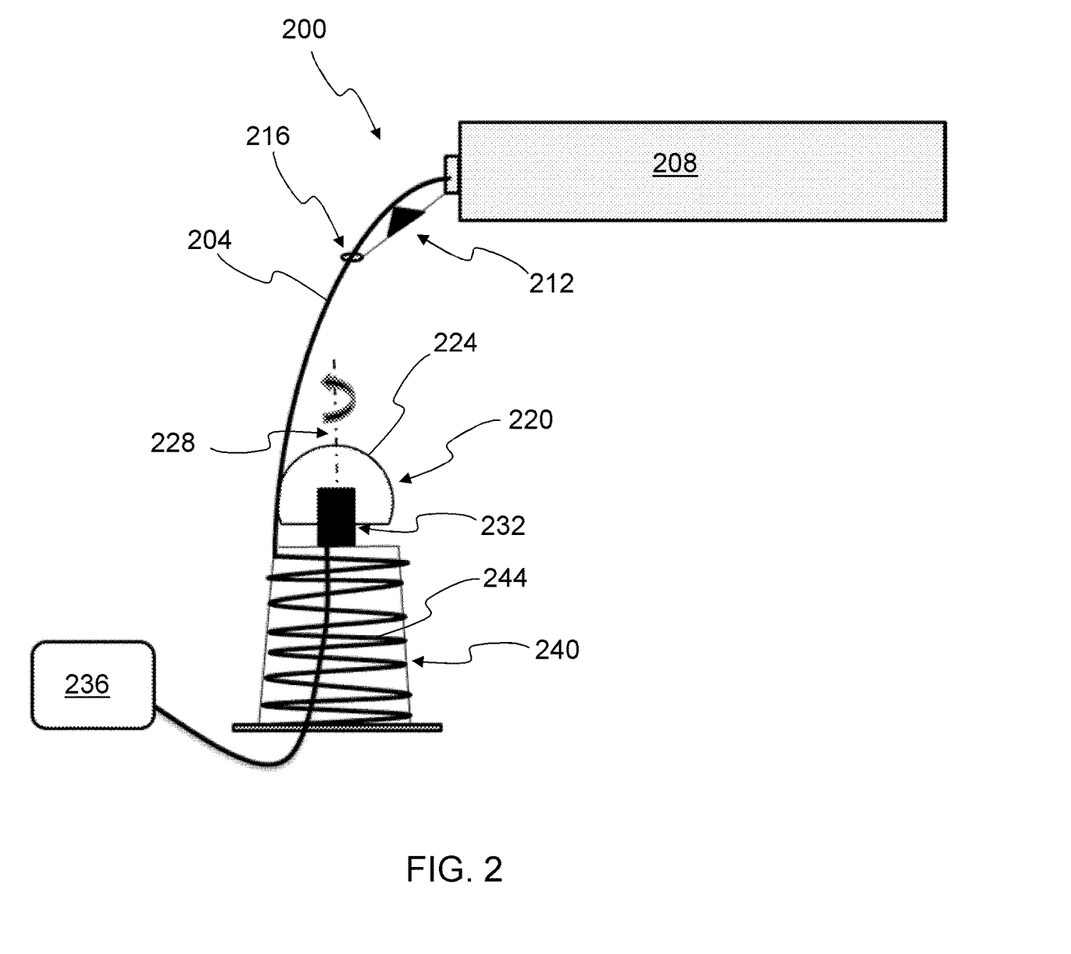
FIG. 2 schematically illustrates an embodiment of a system for collecting an extruded filament prepared from a thermoplastic polymer composite, including from the electrically conductive polymer composite of FIG. 1.

(8) The extruded filament from step 7 is received by the collection system shown in FIG. 2.

FIG. 2 schematically illustrates an embodiment of a system for continuously collecting the extruded filament (which may be prepared from a polymer composite which may or may not be the electrically conductive thermoplastic polymer composite illustrated in FIG. 1), indicated generally as 200, and especially for extruded filaments having lower melt strength. In system 200, filament 204 exiting from extruder 208 is guided by a filament platform, indicated generally as 212, through a guiding circular orifice 216 aligned with the center of a vertically rotating hemispherical-shaped member, indicate generally as 220, which has a hemispherical-shaped outer surface 224 and which is rotated vertically about a vertical axis indicated by dotted line 228 by motor 232 connected to power supply 236. The rotational forces generated by vertically rotating member 220 further guide filament 204 along outer surface 224 as filament slides thereon so as to wind filament 204 around a generally cylindrical-shaped filament collector 240 (also vertically aligned with vertical axis 228) forming a coil of the filament, indicated generally as 244. System 200 permits collection of extruded filaments 204 having relatively low melt strengths due to gentle winding of filament 204 in filament collector 240 primarily through gravitational forces and without significant stretching of filament 204.

The above described method of preparing the composite by using a low shear solvent evaporator (e.g., rotary evaporator (rotovap), etc.), lyophilizer, other vacuum distiller, etc., that solvent evacuation/removal under low shear conditions. Rotational mixing under low shear, such as present in rotovap, also allows uniform coverage (e.g., deposition) of the processing additives (e.g., the plasticizer and thermal stabilizer) onto the surface of the solids (e.g., the thermoplastic polymers, carbon nanofibers/graphene nanoplatelets/conductive metal nanoparticulates, nanoscopic particulate fillers, etc.), as well allowing for the formation of, for example, three dimensional electrically conductive network (when incorporating electrically conductive materials) within the bulk of the composite which is largely preserved after subsequent processing, for example, by extrusion into filaments. By using gentle, relatively low shear mixing and evaporation devices (e.g., a rotovap) in this method enables substantially uniform distribution of the plasticizer and thermal stabilizer, as well as, for example, the solid electrically conductive materials (e.g., carbon nanofibers, graphene nanoplatelets, conductive metal nanoparticulates, etc.) within these composites, thus creating an electrically conductive network throughout the structure of these composites (see FIG. 1), but preserving or substantially preserving the structural integrity of the conductive components (such as the vapor grown carbon nanofibers). The composites prepared in this manner may be later deposited/melted/extruded by relatively low shear equipment, such as a single screw extruder, to yield electrically conductive articles containing a highly branched framework of conductive pathways (formed by carbon nanofibers/graphene nanoplatelets/conductive metal nanoparticulates) which may allow for higher conductivity of the resulting articles along with a relatively small load of the conductive component(s). In particular, this process may yield a highly electrically conductive polymer composites, as well as articles made from such composites, with a very low volumetric resistivity (i.e., higher conductivity) of about 1 Ohm×cm or below. Alternatively, and by incorporating structural reinforcement materials, non-conductive reinforced thermoplastic polymer composites possessing lower electrical conductivity (higher resistivity) may be obtained, and some embodiments, electrically conductive materials (e.g., carbon fibers, graphene nanoplatelets, metal nanoparticles, etc.) may be added in and amount below percolation threshold, will still providing such non-conductive reinforced thermoplastic polymer nanocomposites.

In another embodiment of the present invention, the electrically conductive polymer composite may be prepared by a solvent route. In the solvent route, the PLA/PHA/PCL polymers may be dissolved in the appropriate solvent, such as chloroform, dichloromethane, etc., to form a solution of the PLA/PHA/PCL polymers. The remaining components of the composite, such as the carbon nanofibers/graphene platelets/conductive metal nanoparticulates, plasticizer, thermal stabilizer, nanoscopic particulate filler, etc., may then be added to this solution of PLA/PHA/PCL polymers to form a substantially dispersion of these other components in this solution. The resulting dispersion may then be poured into, for example, a tray, with the solvent being removed, for example, by evaporation of the solvent, or by any other applicable technique for solvent removal. The resulting dry film of electrically conductive polymer composite may then be chopped up, ground, etc., and then used for injection molding, SLS applications, etc., as is or may be dispersed in appropriate media for ink-jet printing applications or may be extruded into a filament, as described above.

Another embodiment of the present invention involves a method of further improving the mechanical properties (e.g., strength, etc.) of these printed conductive architectures by customer-friendly post-processing techniques that enable printed, molded, etc., components, parts, etc., to be further mechanically altered by drilling, sawing, sanding, polishing, etc., without significant softening, melting, disintegrating of the component, part, etc. Upon exiting extruder, the extruded material (e.g., filament) may be cooled relatively fast before it is collected and spooled. Therefore, the extruded material comprising the PLA/PHA/PCL polymers (as well as other thermoplastic polymers) may be amorphous or substantially amorphous, with a relatively low glass transition ($T_g$) temperature and thus may be lacking any significant mechanical strength. These lower crystallization rates along with lower glass transition ($T_g$) temperature of the thermoplastic polymers (including the PLA/PHA/PCL polymers) present in these composites may thus limit those applications of these composites where certain mechanical properties may be required. Therefore, increasing the degree of crystallinity of these thermoplastic polymers (including the PLA/PHA/PCL polymers) in these composites may be desirable for improving the mechanical properties of such composites.

Multiple techniques may be used to improve the degree of crystallinity of such composites comprising thermoplastic polymers (including the PLA/PHA/PCL polymers). One such technique is by introducing some additives (e.g., calcium carbonate, titanium dioxide, graphene nanoplatelets, etc.) to seed the crystallization of the thermoplastic polymers to increase the rate of crystallization. If the extruded composite comprising the thermoplastic polymers is the end (finished) product, such techniques for improving the rate of crystallization of the thermoplastic polymers may be beneficial. However, if the thermoplastic polymer composite comprising these polymers is to be extruded, for example, into a filament to be used in three-dimensional (3D) printing or in injection molding techniques where the extruded composite undergoes an additional melting-fast cooling cycle, a material comprising amorphous thermoplastic polymers may be created once again, rendering such seed crystallization valueless.

Instead, in some embodiments of the present invention, the already molded, printed, etc., component, part, article, etc., may be tempered by heating the component, part, article, etc. above the glass transition ($T_g$) temperature of the thermoplastic polymers present therein, but without reaching a temperature range at which the thermoplastic polymer melts, softens, etc., for example, for PLA/PHA/PCL polymers, a temperature in the range of from about 80° to about 120° C., followed by very slowly cooling (e.g., for PLA/PHA/PCL polymers, at a rate in the range of about 2° to about 5° C./min) the heated component, part, article, etc., (i.e., at the ambient conditions (e.g., room temperature) such that the thermoplastic polyester has a degree of crystallization of about 30% or greater, such as about 40% or greater. By heating the component, part, article, etc., comprising the thermoplastic polymer above its glass transition temperature, but without reaching the temperature range at which the thermoplastic polymer melts, softens, etc. combined with slower cooling, components, parts, articles, etc., which are post-processed in this manner may be mechanically stronger, and may thus be machinable, for example, by drilling, sawing, sanding, etc., with conventional tools without significant melting, softening, structural disintegration, etc.

In some embodiments, metal particles or wires (such as metal nanoparticles, metal nanowires, etc.) may be added to these electrically conductive thermoplastic polymers (including PLA/PHA/PCL polymer) composites, and may thus further boost the electrical and thermal conductivity of the composite. In other embodiments, these structurally reinforced electrically conductive thermoplastic polymer composites may also be imbedded with other electrically conductive additives, such as metals, conductive metal oxides, metal-coated materials, other conductive carbon-based materials, etc., and may thus take the form of particles, powders, foils, flakes, rods, fibers, etc. In one embodiment, metals may be used as additives and may include, for example, one or more of: aluminum, palladium, platinum, nickel, copper, silver, gold, bronze, or chromium, as well as metal oxides such as, for example, indium tin oxide, antimony tin oxide, other fillers coated with metal oxides, etc.

In some embodiments of the present invention, metal oxide particles such as cuprous oxide (CuO) may be introduced into these structurally reinforced electrically conductive thermoplastic polymers (including PLA/PHA/PCL polymer) composites along with a reducing agent during composite preparation. For example, the procedure for reducing thin films on low temperature substrates, as described in U.S. Pat. No. 8,945,686 (Pope et al.), issued Feb. 3, 2015, and for which the entire contents and disclosure of which is herein incorporated by reference, may be used to introduce such metal oxide particles during composite preparation to provide conductive materials in the form of filaments, pellets, powder or inks which may formed or printed into articles made of such conductive materials by any additive manufacturing technique. For example, these thermoplastic polymer composites additionally containing copper oxide (CuO) along with a reducing agent, as well as other functional additives may be subjected to brief exposure to the high intensity pulsed electromagnetic radiation, along with heating in some embodiments, to produce metallic copper particles in the surface layers of the article made from such composites to further boost electrical conductivity. The pulsed electromagnetic source may be laser, flash lamp, directed plasma arc lamp, microwave or radio frequency induction heater capable of delivering pulse length of less than 20 microseconds (μs). The electromagnetic source may have emissions greater then 500 W/cm$^2$. The conductive article (filament, pellets, powder, ready-printed part, traces, etc.) may be statically irradiated or conveyed past the light source. The reducing agent may be ethylene glycol/glycerol, glucose, glutaric acid, ascorbic acid, etc. The composite may additionally contain surfactants such polyvinylpyrrolidone (PVP), anionic surfactants such as alkyl sulfates or their respective salts (e.g., Tergitols, etc.), nonionic surfactants such as phenyl polyethylene oxides (e.g., Tritons, etc.), ethoxylated acetylenic diols (e.g., Dynol 604, Dynol 607, etc.), etc.

Examples of Applications

Examples of uses for these electrically conductive polymer (including PLA/PHA/PCL polymer) composites (including structurally reinforced electrically conductive polymer composites) may include, for example: printed electronic circuitry (e.g., circuit boards); conductive traces; flexible circuits; membrane switches; keypads; improved electrodes for rechargeable lithium-ion batteries; thin film batteries; heat sinks for semiconductor laser diodes; roll to roll thick film printing of 3D current conductors; reduction or total replacement of metals in 3D composites such as lightweight, high strength aircraft parts; catalyst supports; etc.

Examples of commercial applications of these electrically conductive polymer composites (including structurally reinforced electrically conductive polymer composites) may include, for example: solar cell grid collectors, lightning surge, protection, electromagnetic interference shielding (EMI shielding), electromagnetic radiation shields, electrostatic shields, flexible displays, photovoltaic devices, smart labels, myriad electronic devices (music players, games, calculators, cellular phones), decorative and animated posters, active clothing, RFID tags, etc.

Embodiments these electrically conductive polymer composites may be suitable, for example, for creating "printed conductive circuitry" that may, for example, be deposited, or may be "printed' using a variety of modern techniques, such as 3D printing, inkjet printing, selective laser sintering (SLS), fused deposition modeling (FDM), injection molding, and other methods. For example, complete conductive circuits, pathways, etc., may be imbedded into an insulating frame or casing and may be printed in one continuous process, easing dramatically the production and assembly of the final component, part article, etc. These printed conductive pathways may be used to create integrated electrical circuitry (e.g., as printed circuit boards), heat sinks, ion batteries, (super)capacitors, antennae (e.g., RFID tags), electromagnetic interference shielding, electromagnetic radiation shields, solar cell grid collectors, electrostatic shields, or any other application where conductors of electrical current are used. The ability of these electrically conductive polymer composites to be printed together with other components of the final article, component, part, etc., makes their use advantageous compared to other methods (e.g., lithography etc.) due to: higher throughput since all materials may be printed on the same equipment (e.g., printer); better compatibility between components since all materials are polymer based; ability to create complex three-dimensional (3D) structures; ability to seamlessly integrate conductive circuits into the bulk of the final product; simultaneous incorporation of components with single or multiple functionalities; ease of production, since all components may be produced in one process without or minimum post-printing treatment, etc. Alternatively, structurally reinforced non-conductive thermoplastic polymer composites may be formed by such techniques for articles used in, for example, automotive industries, aerospace industries, sports industries, etc.

Fused Deposition Modeling (FDM) and Other Three-Dimensional (3D) Printing.

Three-dimensional (3D) additive manufacturing techniques may be used to extrude filaments prepared from these electrically conductive polymer (including PLA/PHA/PCL polymer) composites through a nozzle and onto a supporting substrate. The precisely controlled (computer controlled) motion of the nozzle in such 3D printing allows polymer deposition in three dimensions. FDM printing may differ from other 3D printing techniques in using a supportive polymer structure, which may be removed after the model is complete, while other 3D printing techniques may not have to use such supports. These electrically conductive polymer composites may be produced, as described in embodiments of the present invention, to be conductive, magnetic, reinforced, etc., or a combination of such properties, in the form of filaments to fit currently available 3D printers. The compositions of these polymer composites may be altered to enable extrusion of these filaments at conditions used in those printers (e.g., by using plasticizers and other additives). For example, electrically conductive polymer composites may be co-printed together with other non-conductive plastics using multi-nozzle printers, thus building an entire product in one continuous process using a single computer model.

Selective Laser Sintering (SLS).

These electrically conductive polymer (including PLA/PHA/PCL polymer) composites may also be useful in powdered form (for example by grinding/milling the extruded conductive composite filament) in SLS and similar 3D printing techniques which may enable the production of complex three-dimensional (3D) structures using these polymer composites. These polymer composites may be used in the form of a powdered material which may be heated in the focal point of a laser source, resulting in the local melting and sintering the polymer composite particles together. The movement of the laser focal point in the XY plane, together with the movement of the base containing the polymer precursor in the Z direction, may result in the formation of a 3D object.

Inkjet Printing.

These electrically conductive polymer (including PLA/PHA/PCL polymer) composites may also be useful in inkjet printing, wherein the composite may be deposited through the expulsion of a liquid solution (i.e., composites dissolved, dispersed, etc., in a liquid solvent) thereof from a container under high pressure in the form of small droplets into and onto substrate. Once on the substrate, the solvent may be quickly dried leaving these electrically conductive polymer composites adhered to the surface. Alternatively, the use of solvent may be avoided by using photo-curable materials such as inks, which are liquid in the initial form and which may be printed into or onto the substrate using conventional jet printing methods. Once on the surface, these curable inks may be exposed to light (such as UV light), resulting in the formation of an electrically conductive polymer composite film. These electrically conductive polymer composites may be prepared in the form of an ink suitable for inkjet printing by using, for example, quick drying solvents (e.g., ketones, chlorinated hydrocarbons, etc.), etc. For example, the use of ethyl cellulose as a dispersant may enable a very high carbon loading (in the case of these electrically conductive polymer composites) without a significant increase in viscosity, which may be desirable for creating highly conductive and printable inks. These electrically conductive polymer composite dispersions may be also introduced into monomer or oligomer blends containing photoinitiators, electroinitiators, or thermal initiators, thus resulting in a conductive curable ink.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the scope of the present invention should not be limited by any of the above described exemplary embodiments.

In addition, it should also be understood that any figures in the drawings that highlight any functionality and/or advantages, are presented herein for illustrative purposes only. The disclosed architecture is sufficiently flexible and configurable, such that it may be utilized in ways other than those that may be shown. For example, the steps listed in any flowchart may be re-ordered or only optionally used in some embodiments.

Further, the purpose of the Abstract of the Disclosure in this application is to enable the U.S. Patent and Trademark Office, as well as the public generally, including any scientists, engineers and practitioners in the art who are not familiar with patent or other legal terms or phraseology, to determine quickly from a cursory inspection the nature and essence of the technical disclosure of the application. Accordingly, while the Abstract of the Disclosure may be used to provide enablement for the following claims, it is not intended to be limiting as to the scope of those claims in any way.

This application may also incorporate material which is subject to copyright protection. The copyright owner has no objection to the facsimile reproduction by anyone of this application or any portion of this disclosure, as it appears in the Patent and Trademark Office patent/patent application file or records, for the limited purposes required by law, but otherwise reserves all copyright rights whatsoever.

Finally, it is the applicants' intent that only claims that include the express language "means for" or "step for" be interpreted under 35 U.S.C. § 112, paragraph 6. Claims that do not expressly include the phrase "means for" or "step for" are not to be interpreted as being within the purview of 35 U.S.C. § 112, paragraph 6.

What is claimed is:

1. A 3D printing electrically conductive polymer composite filament, the composite filament comprising:

one or more particulate thermoplastic polyesters selected from the group consisting of polylactic acid (PLA) polymers, polyhydroxyalkanoate (PHA) polymers, and polycaprolactone (PCL) polymers in an amount of from about 65 to about 80% by weight of the composite filament;

one or more electrically conductive components selected from the group consisting of carbon nanofibers, graphene nanoplatelets, and conductive metal nanoparticulates in an amount of from about 5 to about 20% by weight of the composite filament;

one or more plasticizers in an amount of from about 0.1 to about 30% by weight of the composite filament;

one or more thermal stabilizers in an amount of from about 0.05 to about 5% by weight of the composite filament; and one or more nanoscopic particulate fillers in an amount of from about 0.1 to about 10% by weight of the polymer composite filament;

wherein the electrically conductive components, the plasticizers, the thermal stabilizers, and the nanoscopic particulate fillers are distributed in the composite filament resulting in a heat tempered degree of crystallization of 30% or greater;

wherein the electrically conductive components are distributed substantially uniformly in the composite filament with resulting volumetric resistivity not greater than about 1 Ohm-cm to form an electrically conductive network within the composite filament for 3D printing electrically conductive architectures.

2. The composite filament of claim 1, wherein the particulate thermoplastic polyesters are in an amount of from about 75 to about 80% by weight of the composite filament.

3. The composite filament of claim 1, wherein the particulate thermoplastic polyesters comprise one or more polylactic acid (PLA) polymers in the form of powders.

4. The composite filament of claim 1, wherein the particulate thermoplastic polyesters comprise one or more polyhydroxyalkanoate (PHA) polymers in the form of powders.

5. The composite filament of claim 4, wherein the polyhydroxyalkanoate (PHA) polymers comprise one or more of: poly-beta-hydroxybutyrate (PHB); poly-alpha-hydroxybutyrate; poly-3-hydroxypropionate; poly-3-hydroxyvalerate; poly-4-hydroxybutyrate; poly-4-hydroxyvalerate; poly-5-hydroxyvalerate; poly-3-hydroxyhexanoate; poly-4-hydroxyhexanoate; poly-6-hydroxyhexanoate; or polyhydroxybutyrate-valerate (PHBV).

6. The composite filament of claim 1, wherein the electrically conductive components are in an amount of from about 8 to about 13% by weight of the composite filament, and wherein the electrically conductive components comprise conductive metal particulates that comprise one or more of silver and copper.

7. The composite filament of claim 1, wherein the nanoscopic particulate fillers are in an amount of from about 1 to about 5% by weight of the composite filament, and wherein the nanoscopic particulate fillers comprise one or more of: titanium oxides; magnesium oxide; hydrous magnesium silicate; aluminum oxides; or silicon oxides.

8. The composite filament of claim 7, wherein the nanoscopic particulate fillers comprise titanium oxides.

9. The composite filament of claim 1, wherein the plasticizers are in an amount of from 5 to about 15% by weight of the composite filament, and wherein the plasticizers comprise one or more of: tributyl citrate; acetyl tributyl citrate; diethyl phthalate; glycerol triacetate; glycerol tripropionate; triethyl citrate; acetyl triethyl citrate; triphenyl phosphate; resorcinol bis(diphenyl phosphate); olicomeric phosphate; propylene glycol; epoxy-functionalized propylene glycol; polyethylene glycol; polypropylene glycol; epoxidized soybean oil; acetylated coconut oil; linseed oil; or epoxidized linseed oil.

10. The composite filament of claim 9, wherein the plasticizers comprise tributyl citrate.

11. The composite filament of claim 1, wherein the thermal stabilizers are in an amount of from about 0.1 to about 1% by weight of the composite, and wherein the thermal stabilizers comprise one or more of: triphenyl phosphite, diphenylalkyl phosphite; phenyldialkyl phosphite; tris(nonylphenyl)phosphite (TNPP); trilauryl phosphite; trioctadecyl phosphite; distearylpentaerythritol diphosphite; tris(2,4-di-test-butylphenyl)phosphite; diisodecylpentaerythritol diphosphite; bis(2,4-di-tert-butylphenyl)pentaerythritol diphosphite; bis(2,4-di-cumylphenyl) pentaerythritol diphosphite; bis(2,6-di-tert-butyl-4-methylphenyl)pentaerythritol diphosphite; diisodecyloxypentaerythritol diphosphite; bis(2,4-di-tert-butyl-6-methylphenyl)-pentaerythritol diphosphite; bis(2,4,6-tris(tert-butylphenyl)pentaerythritol diphosphite; tristearylsorbitoltriphosphite; tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine; bis(2,4-di-tert-butyl-6-methylphenyl)methyl phosphite; bis(2,4-di-tert-butyl-6-methylphenyl)ethyl phosphite; 6-fluoro-2,4,8,10-tetra-tert-butyl-12-methyl-dibenz[d,g]-1,3,2-dioxaphosphocine; 2,2',2"-nitrilo-[triethyltris(3,3',5,5'-tetra-tert-butyl-1,1'-biphenyl-2,2'-diyl)phosphite]; 2-ethylhexyl (3,3',5,5'-tetra-tert-butyl-1,1'-biphenyl-2,2'-diyl)phosphite; 5-butyl-5-ethyl-2-(2,4,6-tri-tert-butylphenoxy)-1,3,2-dioxaphosphirane; bis(2,6-di-tert-butyl-4-methylphenyl)pentaerythritol diphosphite; triphenylphosphine (TPP); trialkylphenylphosphine; bisdiphenylphosphino-ethane; trinaphthylphosphine; or poly(propylene glycol)diglycidyl ether.

12. The composite filament of claim 11, wherein the thermal stabilizers comprise one or more of: tris(nonylphenyl)phosphite (TNPP);
triphenylphosphine (TPP); (tris(2,4-di-tert-butyl-phenyl) phosphite); or poly(propylene glycol)diglycidyl ether.

13. The composite filament of claim 1, wherein the heat tempering includes heating the composite filament to a temperature range of about 80 to 120 degrees Celsius and cooling the composite filament at a cooling rate of about 2 to 5 degrees Celsius per minute.

* * * * *